(12) United States Patent
Becker et al.

(10) Patent No.: US 7,807,768 B2
(45) Date of Patent: Oct. 5, 2010

(54) HIGHLY VISCOUS, LARGELY AMORPHOUS POLYOLEFIN

(75) Inventors: Hinnerk Gordan Becker, Essen (DE); Hans Guenther Wey, Singapore (SG); Wolfgang Kilian, Marl (DE); Thomas Stojetzki, Marl (DE); Marion Vornholt, Herten (DE); Marlies Vey, Marl (DE); Juergen Derks, Gelsenkirchen (DE); Hans-Dieter Zagefka, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 201 days.

(21) Appl. No.: 11/911,421

(22) PCT Filed: Mar. 13, 2006

(86) PCT No.: PCT/EP2006/060648

§ 371 (c)(1),
(2), (4) Date: Oct. 12, 2007

(87) PCT Pub. No.: WO2006/108744

PCT Pub. Date: Oct. 19, 2006

(65) Prior Publication Data

US 2008/0194765 A1  Aug. 14, 2008

(30) Foreign Application Priority Data

Apr. 13, 2005  (DE) .................. 10 2005 017 201

(51) Int. Cl.
  *C08F 10/04*  (2006.01)
  *C08L 23/00*  (2006.01)
(52) U.S. Cl. .................. 526/348.6; 525/240
(58) Field of Classification Search .......... 525/240; 526/348.6
  See application file for complete search history.

(56) References Cited

U.S. PATENT DOCUMENTS 4,309,522 A   1/1982  Dietrich et al.
5,989,725 A * 11/1999  Bullard et al. .............. 428/516
6,586,543 B1  7/2003  Wey et al.
7,014,886 B2  3/2006  Vey et al.

FOREIGN PATENT DOCUMENTS

EP  0335 484  *  2/1989
EP  0 335 484     10/1989
EP  0 729 984      9/1996

OTHER PUBLICATIONS

U.S. Appl. No. 11/911, 394, filed Oct. 12, 2007, Becker, et al.
U.S. Appl. No. 11/917,104, filed Dec. 10, 2007, Vey, et al.

* cited by examiner

*Primary Examiner*—Ling-Siu Choi
*Assistant Examiner*—Sonya Wright
(74) *Attorney, Agent, or Firm*—Oblon, Spivak, McClelland, Maier & Neustadt, L.L.P.

(57) ABSTRACT

A polyolefin which contains the following monomer units:
a) not more than 25% by weight of units which are derived from ethene,
b) not more than 75% by weight of units which are derived from propene and
c) from 5 to 100% by weight of units which are derived from an α-olefin having 4 to 20 carbon atoms,
the polyolefin having the following parameters:
d) a weight-average molecular weight in the range of from 70 000 to 10 000 000 g/mol,
e) a polydispersity in the range of from 4 to 60,
f) a melt viscosity, measured by oscillation rheometry at a shear rate of 1 Hz at 190° C., in the range of from 100 000 to 100 000 000 mPa·s,
g) a needle penetration in the range of from 3 to 70·0.1 mm,
h) an enthalpy of fusion in the range of from 2 to 100 J/g,
i) a glass transition temperature $T_g$ in the range of from −15° C. to −80° C. and
j) a final melting point of the crystalline fraction in the range of from 85 to 175° C.,
is compatible both with ethylene polymers and with propylene polymers and is suitable for use in sheets, sealing sheets and shaped articles.

22 Claims, No Drawings

HIGHLY VISCOUS, LARGELY AMORPHOUS POLYOLEFIN

CROSS-REFERENCE TO RELATED APPLICATIONS

The present application is a 35 U.S.C. §317 National Stage patent application of International patent application PCT/EP06/060648, filed on Mar. 13, 2006, which claims priority to German patent application DE 102005017201.6, filed on Apr. 13, 2005.

The invention relates to a poly-α-olefin which simultaneously is substantially amorphous and has a high molecular weight and which, owing to its properties, is suitable, for example, for use in polymer films and deadening and insulation sheets. In order to meet the requirements in the application areas described, a particular ratio of molecular weight, molecular weight distribution (polydispersity), degree of branching (alpha value), crystallinity, glass transition temperature and viscosity behavior (structural viscosity) must be present, which ratio can be established by means of the monomer composition and the parameters of the preparation process. The invention also relates to a preparation process by means of which such poly-α-olefins are obtainable.

Substantially amorphous poly-α-olefins have long been known. Catalyst systems which consist of the reaction product of a titanium trihalide with an aluminum compound on the one hand and a titanium oxyhydrocarbon on the other hand are described even in DE-A-1 442 831. With the use of this catalyst system, amorphous polyolefin copolymers are obtained. It is expressly pointed out that amorphous products can be obtained only with the titanium oxyhydrocarbon component. The catalysts described have very low activity, which makes the entire process uneconomical. Moreover, the titanium oxyhydrocarbons described are complicated to handle.

DE-A-15 20 249, DE-A-15 20 289 and DE-A-17 95 620 state that amorphous polyolefin co- or terpolymers of ethene, an α-olefin and an olefin having an "internal" double bond (e.g. 2-butene) can be obtained. However, the low-pressure polyolefin catalysts of the first generation which are used have extremely low activity, which leads to a very high ash content of the polymers. Moreover, truly amorphous polymers are obtained only with the aid of olefins having an "internal" double bond, which leads to very long reaction times. Polymers having high molar masses and high melt viscosities cannot be economically prepared in the manner described.

DE-A-23 06 667 discloses that substantially amorphous poly(1-butene) polymers can be prepared by the low-pressure polymerization process by polymerization of 1-butene, optionally in the presence of other olefins, at temperatures of from 40 to 120° C., in solution, with the aid of a mixed catalyst comprising $TiCl_3 \cdot n\, AlCl_3$ (n=0.2-0.6) and a suitable trialkylaluminum. According to the examples, products having melt viscosities up to 184 000 mPa·s/170° C. are obtained. These products have a low softening point (86° C. in example 3). Owing to their low melt viscosity and low softening point, they are not suitable for the intended applications.

In DE-A-29 30 108 substantially amorphous 1-butene/propene/ethene terpolymers having a high softening point are prepared in a similar manner, a mixed catalyst comprising $TiCl_3 \cdot n\, AlCl_3$ (n=0.3-0.35) and a trialkylaluminum as cocatalyst being used. Products having melt viscosities of from 1000 to 100000 mPa·s/190° C. are obtained. These products have a softening point of from 90 to 135° C. and a needle penetration of not more than 25·0.1 mm. Owing to their low melt viscosity, they are not suitable for the intended applications.

In DE-A-100 31 293, substantially amorphous, flexible polyolefins are prepared with the aid of a mixed catalyst prepared on the basis of a magnesium chloride support and milled with aluminum trichloride and titanium tetrachloride, likewise with the aid of a trialkylaluminum cocatalyst, the mixed catalyst being activated before the polymerization by oxygen or a compound which contains active oxygen. α-Olefin copolymers having melt viscosities of from 300 to 400 000 mPa·s/190° C. and, alternatively, copolymers of higher α-olefins (such as, for example, 1-octene) having weight average molecular weights of up to 2 000 000 are obtained, said copolymers having a needle penetration of from 18 to 90·0.1 mm. The products described are too soft for use in, for example, film or sheet applications; moreover, they have too high a tack or plastic deformability. Owing to the very high tendency of these polymers to exhibit structural viscosity behavior, their processability is difficult. The polymers described which have proportions of higher α-olefins are moreover problematic with regard to compounding; they cannot be granulated or can be granulated only with very great effort. The supported catalyst described is moreover expensive.

EP-A-0 335 484 describes the preparation of substantially amorphous α-olefin co- or terpolymers using a magnesium-supported mixed catalyst system. The catalyst system used has a strong tendency to form low molecular weight polymer constituents and it is for this reason that the polymerization temperature is limited to the very narrow range of 55-60° C. The polymers obtained have very low viscosities (from 1000 to 8000 mPa·s/190° C.) and are therefore not suitable for the intended application in the film or sheet sector.

DE-A-26 37 990 describes terpolymers which have a propene content of at least 93.2% by weight and an ethene proportion of not more than 1.9% by weight and a 1-butene proportion of not more than 4.9% by weight. Here too, a $TiCl_3$ mixed catalyst and a cocatalyst designated as an "activator" are used. Although the products have a high molecular weight, they are substantially crystalline. Owing to their composition, they have only poor compatibility with polyethylene and insufficient miscibility with bitumen.

JP-A-2000198892 describes amorphous α-olefin terpolymers having an ethene content of from 1 to 49 mol %, a propene content of from 50 to 98 mol % and a $C_4$-$C_{20}$-α-olefin content of from 1 to 49 mol %. However, they have a very narrow molecular weight distribution of not more than 4, with the result that adhesive properties are adversely affected. Moreover, they exhibit no melting point in DSC measurements, i.e. are completely amorphous with all disadvantages associated therewith, such as poor handling properties and low heat stability.

Compared with the prior art, it was the object to provide a polyolefin which has a sufficiently high molecular weight to enable its use as material of a sheet layer, and which has good compatibility with or good layer adhesion to both polyethylene and polypropylene. The polyolefin should also be transparent at the customary sheet layer thicknesses but should nevertheless be sufficiently crystalline to have sufficient cohesion and a ratio of restoring force to resilience or plasticity which satisfies even demanding applications. There should also be sufficient crystallinity in order, if desired, to ensure a surface which is not tacky at ambient temperature and a negligible tendency to creep.

This object was achieved by a polyolefin which contains the following monomer units:

a) not more than 25% by weight, preferably from 0.1 to 20% by weight and particularly preferably from 1 to 16% by weight of units which are derived from ethene, b) not more than 75% by weight, preferably from 0.1 to 70% by weight and particularly preferably from 4 to 65% by weight of units which are derived from propene, the upper limit of these units being 60, 55 or 50% by weight in further preferred embodiments, c) from 5 to 100% by weight, preferably from 10 to 95% by weight and particularly preferably from 15 to 90% by weight of units which are derived from an α-olefin having 4 to 20 carbon atoms, the polyolefin having the following parameters:

d) a weight-average molecular weight in the range of from 70 000 to 10 000 000 g/mol, preferably from 85 000 to 5 000 000 g/mol and particularly preferably from 100 000 to 2 500 000 g/mol, further preferred lower limits being 120 000 g/mol or 140 000 g/mol, e) a polydispersity in the range of from 4 to 60, preferably in the range of from 4.2 to 40, particularly preferably in the range of from 4.5 to 30, especially preferably in the range of from 4.6 to 20 and very particularly preferably in the range of from 4.8 to 15, f) a melt viscosity, measured by oscillation rheometry at a shear rate of 1 Hz at 190° C., in the range of from 100 000 to 100 000 000 mPa·s, preferably from 200 000 to 10 000 000 mPa·s and particularly preferably from 300 000 to 5 000 000 mPa·s, g) a needle penetration in the range of from 3 to 70·0.1 mm, preferably in the range of from 5 to 35·0.1 mm and particularly preferably in the range of from 7 to 25·0.1 mm, h) an enthalpy of fusion in the range of from 2 to 100 J/g, preferably in the range of from 5 to 75 J/g, particularly preferably in the range of from 10 to 60 J/g and especially preferably in the range of from 12 to 50 J/g, i) a glass transition temperature $T_g$ in the range of from −15 to −80° C., preferably in the range of from −20 to −60° C. and particularly preferably in the range of from −25 to −55° C., and j) a final melting point of the crystalline fraction in the range of from 85 to 175° C., preferably in the range of from 90 to 173° C. and particularly preferably in the range of from 95 to 170° C.

The polyolefin preferably has an alpha value in the range of from 0.5 to 0.9, preferably in the range of from 0.6 to 0.9 and particularly preferably in the range of from 0.65 to 0.85.

The monomer units according to a), b) and c) originate from the incorporation of the corresponding olefin in the polymerization or copolymerization. The α-olefin according to c) is, for example, 1-butene, 1-pentene, 1-hexene, 1-octene, 1-decene, 1-dodecene, 1-octadecene, 3-methyl-1-butene, a methylpentene, such as, for example, 4-methyl-1-pentene, a methylhexene or a methylheptene.

The polymer composition is determined by a high-temperature $^{13}C$-NMR. The $^{13}C$-NMR spectroscopy of polymers is described, for example, in the following publications:

[1] S. Berger, S. Braun, H.-O. Kalinowski, $^{13}C$-NMR-Spektroskopie [$^{13}C$-NMR spectroscopy], Georg Thieme Verlag Stuttgart 1985

[2] A. E. Tonelli, NMR Spectroscopy and Polymer Microstructure, Verlag Chemie Weinheim 1989

[3] J. L. Koenig, Spectroscopy of Polymers, ACS Professional Reference Books, Washington 1992

[4] J. C. Randall, Polymer Sequence Determination, Academic Press, New York 1977

[5] A. Zambelli et al: Macromolecules, 8, 687 (1975)

[6] A. Filho, G. Galland: J. Appl. Polym. Sci., 80, 1880 (2001)

The properties of adhesion (for example to polymers of the polyethylene or polypropylene type), heat sealability and plasticity, the miscibility with bitumen and the ability to impart compatibility between polyethylene and polypropylene, for example in order to obtain sheet material having high transparency, can be individually established by means of the polymer composition. The co- or terpolymers according to the claims are substantially random polymers. With the use of propene as a monomer, the proportion of isotactic $C_3$-triads in a preferred embodiment is from 20 to 85%, based on the $C_3$-triads present altogether, and particularly preferably from 35 to 70%. With the use of 1-butene as a monomer, the proportion of isotactic $C_4$-triads in a preferred embodiment is from 10 to 75%, based on the $C_4$-triads present altogether, particularly preferably from 20 to 60% and especially preferably from 25 to 50%. These proportions can be determined by means of high-temperature $^{13}C$-NMR.

The molecular weight is determined by high-temperature GPC. The determination is carried out according to ASTM D6474-99, but at a higher temperature (160° C. instead of 140° C.) and with a smaller injection volume of 150 μl instead of 300 μl. The following may be mentioned as further literature on the GPC analysis of polymers:

H. G. Elias: "Makromoleküle" [Macromolecules]; Vol. 2; Wiley-VCH; Weinheim 2001;

Z. Grubisic, P. Rempp, H. Benoit; Polym. Lett.; 5; 753 (1967);

K. A. Boni, F. A. Sliemers, P. B. Stickney; J. Polym. Sci.; A2; 6; 1579 (1968);

D. Goedhart, A. Opschoor; J. Polym. Sci.; A2; 8; 1227 (1970);

A. Rudin, H. L. W. Hoegy; J. Polym. Sci.; A1; 10; 217 (1972);

G. Samay, M. Kubin, J. Podesva; Angew. Makromol. Chem.; 72; 185 (1978);

B. Ivan, Z. Laszlo-Hedvig, T. Kelen, F. Tüdos; Polym. Bull.; 8; 311 (1982);

K.-Q. Wang, S.-Y. Zhang, J. Xu, Y. Li, H. P. Li; J. Liqu. Chrom.; 5; 1899 (1982);

T. G. Scholte, H. M. Schoffeleers, A. M. G. Brands; J. Appl. Polym. Sci.; 29; 3763 (1984).

The solvent used is trichlorobenzene. The measurement is effected at a column temperature of 160° C. The universal calibration used for evaluating the elution curves is carried out on the basis of polyolefin standards. The results are not comparable with measurements whose calibrations were effected on the basis of polymers of a different type, e.g. based on polystyrene, or which are carried out without universal calibration, since otherwise an impermissible comparison of different three-dimensional polymer structures or hydrodynamic radii takes place. Furthermore, the comparison with measurements which use solvents other than the stated solvent is not permissible since different three-dimensional polymer structures or hydrodynamic radii, which lead to a different result in the molecular weight determination, may be present in different solvents.

The polydispersity $P_d$ is defined as the quotient of number average and weight average molar mass. It is in particular a measure of the width of the existing molar mass distribution, which in turn permits conclusions about the polymerization behavior present and the catalyst used. In addition, it is also a measure of the low molecular weight fraction present which in turn influences the adhesion properties of the polymer materials. It is determined by high-temperature GPC. Within certain limits, the polydispersity is characteristic of a certain catalyst-cocatalyst combination. Depending on the procedure used (e.g. 1, 2 or more stirred vessels or combinations of stirred vessel and flow tube) or method of carrying out the reaction (single or multiple metering of catalyst, cocatalyst and monomers), the molar mass distribution can be either monomodal, bimodal or multimodal. The polydispersity has a relatively strong influence on the tack of the material at room temperature and on the adhesion.

In the determination of the molar masses by means of gel permeation chromatography (GPC) the hydrodynamic radius of the polymer chains present in solution plays a particular role. In addition to thermal conductivity, RI (refractive index) or UV/VIS and FTIR or light scattering detectors, viscosity detectors are also used as detection mechanisms. If the polymer chain in solution is considered as an undisturbed coil, the relationship between its limiting viscosity number and the molar mass can be described empirically by the so-called KMHS equation $$[\eta]=K_V M_r^\alpha$$

(H.-G. Elias, Makromoleküle [Macromolecules], volume 2, 6th edition, Wiley-VCH, Weinheim 2001, pages 411-413). $K_V$ and $\alpha$ are constants which are influenced both by the constitution, configuration and molar mass of the polymer and by the solvent and the temperature. The important information of the alpha value in the present case is that of the hydrodynamic radius; this depends on the branching points present on the polymer chains. The alpha value is high in the case of less branching and low in the case of more branching.

The melt viscosity is determined according to ASTM D4440-1 by oscillation rheometry, a shear rate of 1 Hz being employed. The maximum deformation of the sample is chosen so that the sample is present in the linear viscoelastic range during the entire measuring time. Viscoelastic materials are distinguished from Hook solids by the ability to dissipate stresses resulting from deformation over a certain time (relaxation). In contrast to Newtonian liquids, which are subject to an exclusively irreversible deformation under the action of shearing or extension, viscoelastic fluids can recover a part of the deformation energy after the acting force has been removed (so-called "Memory Effect") [N. P. Cheremisinoff; *"An Introduction to Polymer Rheology and Processing"*; CRC Press; London; 1993]. A further characteristic of polymer melts is the occurrence of so-called structural viscosity. This is defined as behavior in which the shear stress as a resultant force degrades the initial structure of the material as a function of the shear rate. Since this degradation process requires a minimum shear rate the material flows like a Newtonian liquid below this shear rate. One explanation is given by the principle of Le Chatelier, the "deviation" of the structure of the viscous liquid (before the application of a mechanical stress) consisting in the orientation along the shear surfaces for reducing the frictional resistance. The latter leads to the degradation of the equilibrium structure of the initial state and to the establishment of a shear-oriented structure, which in turn results in easier flow (reduction in viscosity). In polymer melts, the Newtonian range is perceptible only at very low shear rates or small shear amplitudes. Its determination is possible and necessary by rheometric test methods (amplitude "sweeps", i.e. measurement at fixed frequency as a function of the shear amplitude) if the measurement is to be carried out in the reversible, i.e. reproducible range [R. S. Lenk; *"Rheologie der Kunststoffe" [Rheology of plastics]*; C. Hanser Verlag, Munich; 1971; J. Meissner: *"Rheologisches Verhalten von Kunststoff-Schmelzen und -Lösungen "[Rheological behavior of plastic melts and solutions]* in: *"Praktische Rheologie der Kunststoffe" [Practical rheology of plastics]*; VDI-Verlag; Düsseldorf, 1978; J.-F. Jansson; *Proc. 8th. Int. Congr. Rheol.;* 1980; *Vol.* 3]. Owing to its small applied force, its small deformation and the consequently small effect on the sample morphology, vibration rheometry is particularly suitable for investigating materials which exhibit strong structural viscosity behavior. The structural viscosity is more pronounced only in the range from 200 000 mPa·s. If the ratio of the melt viscosities which were determined at a shear rate of 10 Hz and a shear rate of 0.1 Hz is taken as a scale, this ratio for the claimed polymers is usually from 1:2 to 1:1000, preferably from 1:3 to 1:500 and particularly preferably from 1:5 to 1:50. The ratio of storage modulus to loss modulus can be used as a theological characteristic of the processing window (for example on calenders or in screw machines) and of the particular ratio of molecular parameters, such as, for example, the molar mass and macroscopic material properties, such as, for example, the melt viscosity. For the claimed polymers, this ratio is from 1:1 to 1:100, preferably from 1:1.5 to 1:50 and particularly preferably from 1:2 to 1:20 at a shear rate of 1 Hz in the temperature range from the end of the melting range to 200° C.

The needle penetration is determined according to DIN EN 1426. It can also be controlled in a known manner by means of the monomer composition and the reaction conditions.

The determination of the enthalpy of fusion, of the glass transition temperature and of the melting range of the crystalline fraction is effected by means of differential calorimetry (DSC) according to DIN 53 765 from the 2nd heating curve at a heating rate of 10 K/min. The point of inflection of the heat flow curve is evaluated as the glass transition temperature. In a particular embodiment, this is in the range from −40 to −80° C. The glass transition temperature can be controlled in a known manner by means of the monomer composition and the reaction conditions. In general, the use of longer-chain monomers leads to lower glass transition temperatures. Furthermore, reaction conditions under which shorter-chain polymers also form (for example relatively high polymerization temperatures) also lead within certain limits to the reduction of the glass transition temperature. The enthalpy of fusion is a measure of the crystallinity of the polymer. The claimed polymers have relatively low crystallinity, i.e. they are substantially, but not completely, amorphous. There exists a certain crystallinity which is indispensable for the required material properties. The crystalline regions detectable on melting extend over a large temperature range from 20 to 175° C. and are more or less pronounced in terms of their intensity depending on position. The claimed polymers are distinguished in their crystallinity by the occurrence of monomodal, bimodal and multimodal melting peaks, some of which are sharply separated and some of which have a fluid transition. Polymers having bimodal and multimodal melting peaks are particularly preferred. In a possible embodiment the enthalpy of fusion (as a measure of the total crystallinity) is from 2 J/g to 10 J/g. As a result of the low crystallinity, firstly a high transparency and secondly a special combination of advantageous material properties can be achieved. Polyolefins having low crystallinity exhibit relatively high surface tack (adhesion) at room temperature, which is advantageous, for example, for intermediate layers in multilayer sheets. Moreover, they generally exhibit more flexible mechanical behavior. However, the cohesion of such materials is relatively low, and it is for this reason that these low crystallinities are not generally desired. In a further possible embodiment, the enthalpy of fusion is from 10 J/g to 30 J/g, preferably from 15 J/g to 28 J/g. As a result of the higher crystallinity, a particular combination of advantageous material properties can be achieved. Polymers according to the invention which have relatively high crystallinities, such as, for example, polybutene or butene copolymers having high proportions of butene, have, for example, very good tensile strengths. At the same time, they exhibit relatively little surface tack, which is advantageous, for example, in the case of monolayer films.

The polymers used according to the claims have in many cases a pronounced tendency to low-temperature crystallization, this occurring at a temperature range from −10 to 100° C. In order to accelerate the crystallization or to establish certain crystal modifications in a targeted manner, it is possible to use known nucleating agents, as used, for example, in the case of isotactic polypropylenes. These may be both inorganic and organic and may contain both low molecular weight and high molecular weight components, it being possible to use both crystalline and amorphous nucleating agents in all cases.

According to the prior art, the crystallinity can also be determined by means of the solubility in xylene. Here, a xylene isomer mixture is used, the polymer being dissolved under reflux and the solution then being cooled to room temperature. In the case of the claimed polyolefin the solubility in xylene is preferably from 80 to 99.5%, particularly preferably from 85 to 99% and especially from 90 to 98%. The determination is effected as described in the experimental section.

The highly viscous, substantially amorphous polyolefin according to the claims is obtainable, for example, by polymerization of α-olefin monomers using a $TiCl_3 \cdot (AlCl_3)_n$ mixed catalyst (n=from 0.2 to 0.5), a trialkylaluminum compound (for example triethylaluminum, preferably triisopropylaluminum, particularly preferably triisobutylaluminum) being used as a cocatalyst. It is necessary to choose a particular ratio of catalyst to cocatalyst in order to obtain the described products having the described properties. The molar ratio of catalyst to cocatalyst is from 1:1 to 1:10. The activity of the catalyst used is from 5000 to 20 000 g of polymer/g of catalyst. The ethene monomer is used in gaseous form while the propene and 1-butene monomers can be used both in gaseous form and in liquid form. Higher homologs are used in liquid form. If propene and/or 1-butene are used in liquid form, a pressure corresponding to the reaction conditions which ensures a sufficient monomer concentration in the liquid phase must be maintained in the reactor used. Gaseous hydrogen is used as a molar mass regulator. The polymerization is carried out in an inert solvent which is selected, for example, from the group consisting of the aliphatic hydrocarbons. The mass ratio of polymer to solvent is from 1:100 to 1:0.01, preferably from 1:50 to 1:0.1 and particularly preferably from 1:10 to 1:0.2. In a special embodiment it is from 1:1 to 1:0.01. Polymerization in the initially introduced monomer is also possible. The polymerization is carried out either in a stirred vessel or in a stirred vessel cascade; in a particular embodiment it is also possible to use a flow tube or a tubular reactor with forced transport (e.g. a screw machine). The use of the tubular reactor with forced transport can be effected either as the only solution or in combination with stirred vessel or stirred vessel cascade. Here, both series connection and parallel connection of the individual reactors are possible. The reaction temperature is from 30 to 220° C., preferably from 70 to 150° C. and particularly preferably from 80 to 130° C. In a possible embodiment, particularly if a low polydispersity is desired, the reaction temperature is from 30 to 80° C., preferably from 40 to 60° C. and particularly preferably from 40 to 50° C. In a further possible embodiment, particularly if a high polydispersity is desired, the reaction temperature is from 80 to 200° C., preferably from 100 to 200° C. and particularly preferably from 110 to 190° C. Catalyst and cocatalyst are decomposed in a suitable manner at the end of the reaction, the decomposed catalyst constituents either remaining in the polymer or being removed via a wash step. In practice the decomposition is usually effected in a manner such that the decomposed catalyst components converted into unreactive constituents remain at least partly in the polymer. The polymer is not colored by the decomposed catalyst components converted into unreactive constituents in the preparation process according to the invention. The polymers according to the invention can be chemically stabilized according to the prior art, either in the form of their reaction solution or at a later time, in order to protect them from the harmful effect of higher temperatures, sunlight, atmospheric humidity and oxygen. For example, stabilizers which contain hindered amines (HALS stabilizers), hindered phenols, phosphites, UV absorbers, such as, for example, hydroxybenzophenones, hydroxyphenylbenzotriazoles, etc., and/or aromatic amines may be used. The effective amount of stabilizers is usually in the range of from 0.1 to 2% by weight, based on the polymer.

In particular cases, especially in the case of one-layer sheets, so-called antifogging substances can be used as additives. For example, fatty acid esters and/or glyceryl monooleates or glyceryl dioleates may be used; the effective concentration is as a rule in the range from 0.1 to 2% by weight, based on the polymer. After the polymerization, the claimed polymer is obtained either by precipitation in a precipitating agent of opposite polarity (for example an alcohol, such as, for example, methanol or butanol) or by direct devolatilization with subsequent melting process. In both cases it is possible to use both stirred vessels and stirred vessel cascades or flow tubes or tubular reactors with forced transport (for example a screw machine). In the case of the latter the use of multiscrew machines is particularly preferred, for example of those having a central spindle. The use of classical evaporation apparatuses, such as, for example, falling-film and/or thin-film evaporators, is also possible. The compounding is effected, for example, by means of granulation or pulverization. Possible methods of granulation are, for example, underwater pelletizing or granulation by underwater hot phase cutting. The use of a surfactant and/or dispersant or of a parting agent emulsion may be necessary. It is also possible to use liquefied or low-temperature gases, such as, for example, $CO_2$ and/or $N_2$, as coolants. The pulverization can be effected either by a separate milling step or by using an atomization method. In both cases, the use of supercritical fluids, such as, for example, $CO_2$, water or propane, is also possible. In this process, which is known, for example, by the name PGSS, the polymer melt is mixed with a supercritical medium and then atomized in a spray tower. The particle sizes can be controlled by the nozzle geometry and tower geometry. The milling process can also be effected with the use of low-temperature gases, such as, for example, $CO_2$ and/or $N_2$.

In order to ensure the flowability of the granules and/or of the powder, the flow auxiliaries usually used in the polymer sector may be employed. These may be either inorganic or organic and may contain both low molecular weight and high molecular weight components, it being possible to use both crystalline and amorphous flow auxiliaries in all cases. The flow auxiliaries may be either compatible or incompatible with the claimed polyolefins in the sense of thermodynamic miscibility. Particularly preferred flow auxiliaries are those which are compatible with the claimed polyolefins. Flow auxiliaries which may be used are, for example, polyolefin waxes (those based on polyethylene and those based on polypropylene) as well as Fischer-Tropsch waxes. Polyolefin waxes based on 1-butene may also be used. The use of microwaxes is also possible. In addition to waxes, olefin polymers such as, for example, polyethylene, polypropylene and/or poly(1-butene), in particular isotactic or syndiotactic polypropylene, can also be used. Both waxes and polymers can also be used in modified form (for example modified with maleic anhydride). The use of crosslinked polymers, such as, for example, crosslinked polyolefins or crosslinked styrene/divinylbenzene polymers, in the pulverized state is also possible. Suitable inorganic materials are, for example, MgO, talc, silica, etc.

The polyolefins according to the claims can advantageously be used in sheets, either a one-layer sheet containing the claimed polyolefin or consisting thereof or a multilayer sheet having one or more layers which contain the claimed polyolefin or consist thereof. In the case of such sheets, the claimed polyolefins can be particularly advantageously used as a modifier of an ethylene polymer, propylene polymer or poly-1-butene or as compatibilizer in blends of ethylene polymers and propylene polymers or poly-1-butene. As a result, improved mechanical properties of the blend and improved transparency are obtained. Corresponding blends which contain the following components:

I. from 0.1 to 99.9% by weight, preferably from 1 to 99% by weight, particularly preferably from 5 to 95% by weight and especially preferably from 10 to 90% by weight of the polyolefin according to the claims and
II. from 99.9 to 0.1% by weight, preferably from 99 to 1% by weight, particularly preferably from 95 to 5% by weight and especially preferably from 90 to 10% by weight of a polyolefin selected from the group consisting of ethylene polymer, isotactic propylene polymer, syndiotactic propylene polymer, isotactic poly-1-butene and syndiotactic poly-1-butene, the stated percentages being based on the blend of components I and II, are likewise the subject of the present invention. In a preferred embodiment, the component according to II. is a blend of an ethylene polymer and one or more of the other polyolefins mentioned.

Sheet layers which contain the claimed polyolefins or consist thereof, can also be used for achieving particularly good adhesion to polyethylene, polypropylene or other plastic surfaces (in particular ABS, SAN, polystyrene, polycarbonate, PMMA) or to metal, paper or textile surfaces. With the use of the claimed polyolefins, either as such or in blends, particularly good heat-seal and heat-shrinkage properties can be established in sheet applications. Depending on composition and crystallinity, the sheets can, if desired, also have a high heat distortion resistance. The sheets provide a high water vapor barrier per se; however, the water vapor barrier effect can be reduced by perforation or the incorporation of inorganic constituents. The production of the sheets can be effected by all customary industrial production processes, for example as blown film, cast film, by extrusion or coextrusion, by calendering, etc. Both oriented (monoaxial or biaxial or multiaxial) and unoriented sheets can be produced. The use as a coating of polyethylene and/or polypropylene layers in sheet production is also included, for example by spray application of polymer melt or polymer powder, doctor blade application, etc. The sheets produced can be used in the packaging sector, for example (resealable) food packaging (with or without heat shrinkage, aroma protection packaging, odor barriers, etc.) and as protective sheets (for example for plastic surfaces) or cover sheets.

Sealing sheets constitute a further application. These include both the roof sealing sector and the bridge sealing sector and other related applications. Here, the good miscibility with the bitumen types used in this sector should be emphasized out in particular. The sealing sheets may contain the following constituents: bitumen, adhesive resins, such as, for example aliphatic and/or aromatic hydrocarbon resins, atactic polypropylene, inorganic and/or organic fillers, such as, for example, chips, recycled materials comprising mixed plastics, quartz sand and/or talc. It is also possible to use an inliner which may consist, for example, of glass fibers or glass webs and/or polymer fibers or polymer webs.

It is also possible to prepare molding materials which are to be further processed to give, for example, injection molded, extruded or blown shaped articles. Such molding materials preferably contain the following components:

I. from 0.1 to 99.9% by weight, preferably from 1 to 99% by weight, particularly preferably from 5 to 95% by weight and especially preferably from 10 to 90% by weight of the claimed polyolefin and
II. from 99.9 to 0.1% by weight, preferably from 99 to 1% by weight, particularly preferably from 95 to 5% by weight and especially preferably from 90 to 10% by weight of a polyolefin selected from the group consisting of ethylene polymer, isotactic propylene polymer, syndiotactic propylene polymer, isotactic poly-1-butene and syndiotactic poly-1-butene, the stated percentages being based on the mixture of the components I and II. The invention also relates to such molding materials. Ethylene polymers are primarily HDPE, LDPE, LLDPE and UHMWHDPE, while propylene polymers are primarily homopolypropylene or random or block copolymers with ethylene and/or 1-butene. In the case of such molding materials, the mechanical properties of the polymer or polymers of component II, for example the impact strength and the flexibility, in particular at low temperatures, are positively influenced by the admixing of component I.

In the case of blends of isotactic and atactic polypropylene according to the prior art, it is found that virtually all important material properties are dependent both on the molecular weight and on the content of atactic polypropylene. Particularly to the point are the material parameters of tensile strength, elongation at break and notched impact strength. While all three material parameters increase with increasing molecular weight, the tensile strength decreases with increasing atactic fraction. Elongation at break and notched impact strength on the other hand increase. In general the conditions in the production of finished articles (for example from injection molding) have great influence on the material properties. In particular, the cooling rate and the molecular orientation play a decisive role since these two factors are among the factors responsible for the formation of the crystalline structural state.

Impact-modified polypropylene blends have been intensively studied in the technical literature. Most frequently, polypropylene is toughened with ethene-propene rubber (EPR) or EPDM. Satisfactory results can also be obtained with styrene-butadiene-styrene (SBS), styrene-ethylene-butylene-styrene (SEBS), ethylene-butylene rubber (EBR), styrene-butadiene-acrylonitrile (ABS), polybutadiene, polybutyl acrylate, polyurethanes or polyisoprene. Although polypropylene is not miscible with ethene-propene rubber or EPDM, there is a certain adhesion between the phases. The impact modification is effected in general by finely distributing a rubber component which is immiscible with the polymer matrix (e.g. isotactic polypropylene) in the matrix. The deformation behavior of the distributed rubber particle is substantially responsible for the morphology of the prepared blend or compound and the material properties. Since the particle size must be in the range of <1 μm in order to obtain good material properties, considerable mixing effort is required.

An intensive discussion of the phase structure and the impact strength properties of iPP/EPR blends is to be found, for example, in: L. D'Orazio, C. Mancarella, E. Martuscelli, G. Sticotti, P. Massari; Polymer; 34(17); 3671-81 (1993).

Molding materials based on crystalline polypropylene and atactic polypropylene are described in JP-A-58089635 and JP-A-45012225, while molding materials based on crystalline polypropylene and EPR are described, for example, in DE-A-1 104 694 and WO 03/076511. EP-A-1 176 169 discloses an elastomeric transparent blend of a crystalline polypropylene with an amorphous propylene polymer and an elastomer component. The atactic or amorphous propylene polymer is preferably a homopolymer but may also be a co- or terpolymer having ethylene and/or 1-butene fractions of, preferably, from 0.5 to 13 mol %. The polydispersity of the atactic propylene polymer is <5, preferably <4, most preferably <3, and is achieved with the aid of a metallocene catalyst.

In the case of polypropylene blends or compounds, the customary methods of impact modification generally lead to considerable reduction of hardness and rigidity and in particular to substantial deterioration in the thermoplastic processability. With the use of rubbers, in particular the recyclability of the molding materials is greatly limited; moreover, there is frequently a deterioration in the transparency.

In a particular embodiment, the invention relates to molding material which contains the following components:

I. from 0.1 to 50% by weight, preferably from 0.5 to 30% by weight, particularly preferably from 1 to 20% by weight and especially preferably from 2 to 16% by weight of the claimed polyolefin and II. from 50 to 99.9% by weight, preferably from 70 to 99.5% by weight, particularly preferably from 80 to 99% by weight and especially preferably from 84 to 98% by weight of an isotactic or syndiotactic propylene polymer, the stated percentages being based on a mixture of components I and II.

By means of this molding material, an improvement in the embrittlement properties at low temperature can be achieved in the case of the crystalline polypropylene used. Moreover, impact strength and elongation at break are significantly increased, it being possible to prepare materials having high transparency. These mixtures can be easily processed.

The molding material is preferably prepared in an extrusion process. The blending process can be carried out both in a twin-screw extruder (with corotating or counterrotating screws) and/or in a single-screw extruder having mixing elements.

In a particular embodiment, the use of a reactor blend of a crystalline and substantially amorphous material is also possible. Either the substantially amorphous polymer, for example in the form of a solution and/or melt, is fed into the polymerization reactor of the isotactic or syndiotactic polymerization or polymerization of both polymers takes place in the same process, it being possible for the polymerization to be carried out either in separate reaction containers or in the same reaction container. Suitable polymerization processes are both solution polymerization and slurry polymerization as well as polymerization in the fluidized bed process. Both polymerizations can be effected either by two different polymerization processes or by the same polymerization process. If two different polymerization processes are used, any desired combination of the polymerization processes mentioned is possible. In a further particular embodiment, the blending process is carried out only immediately before or during the injection molding process.

This molding material can be used both in the extrusion process and in the injection molding and/or blow molding process for the production of shaped articles of any type. Examples of the fields of use of such shaped articles are, for example, the automotive sector (for example bumpers, dashboards, interior trim, bodywork parts, underfloor protection covers, cable shafts, air filters, covers in the interior and engine space, etc.), the packaging sector (for example storage containers, bottles, tubes, etc.), the furniture sector (garden and interior furniture, such as, for example, chairs and tables, drawers, etc.), the electronics sector (claddings for electrical parts, such as, for example, housing and/or housing components, etc.), the toy sector (toys of any type, such as, for example, toy cars, plastic toys which can be assembled, dolls, baby toys, construction kits, etc.), the hygiene and medical sector (for example toothbrushes, infusion bags, etc.), the household sector (for example disposable cutlery or crockery, dishes, kitchen utensils, etc.), the textile sector (for example decoration or functional elements) or the office supplies sector (for example pencil coverings, ballpoint pen coverings, housings or housing components, etc.).

The invention is explained by way of example below.

EXAMPLES 1 TO 8

Preparation of the Polyolefins

The monomers stated in table 1, in n-butane, were polymerized with the use of a mixed catalyst comprising a crystalline titanium trichloride in the form of a $TiCl_4$ reduced with aluminum ($TiCl_3 \cdot 0.33\ AlCl_3$) and triisobutylaluminum (in the weight ratio 1:4), at the temperature stated in table 1, in a laboratory autoclave, hydrogen optionally being used as molar mass regulator. Pressures of from 22 to 25 bar occurred. The monomers ethene and propene were metered in continuously during the reaction time of 3 h; the monomer 1-butene and optionally used higher olefins were initially introduced. After 3 h, isopropanol was added to the reaction mixture, with the result that the reaction was stopped. Unconverted monomers and the solvent n-butane were evaporated in an evaporator. The polyolefin melt was discharged at a temperature of about 190° C.

The analysis of the products obtained gave values which are listed in table 1.

Measuring Method 1 for Determining the Solubility in Xylene:

2 g of polyolefin are dissolved in 250 ml of xylene with stirring and heating to the boiling point of xylene. After refluxing for 20 min, the polymer solution is allowed to cool to 25° C. Undissolved or precipitated polyolefin is filtered off with suction (15 cm suction filter, Sartorius 390 filter paper) and dried. The remaining polymer solution is precipitated in a 5-fold excess of methanol (to which one drop of 37 percent strength aqueous HCl is added). The resulting precipitate is filtered off with suction and dried at 80° C. in a drying oven (vacuum).

Measuring Method 2 for Determining $M_w$, the Polydispersity and the Alpha Value:

The samples to be measured are weighed into 4 ml vials, and 3 ml of freshly distilled 1,2,4-trichlorobenzene stabilized with 0.5 g of butylhydroxytoluene/liter are added and said samples are dissolved for 20 minutes with gentle stirring at 165° C. The samples are measured at 160° C. on a Waters 150° C. high-temperature GPC. The flow rate is 1.1 ml/min; a combination of three SDV columns (10e6A, 10e5A and 10e3A plus precolumn, 10 µm) from Polymer Standards Service GmbH, D-55120 Mainz is used. An integrated refraction index detector from Waters and the viscosity detector H502B from Viskotek serve as detectors. A universal calibration with polyolefins is carried out (calibration curve of polystyrene, polyisobutene and polyethylene from Polymer Standards Service GmbH). Weighing in and measuring of all samples are carried out in duplicate. The evaluation is effected using the software package Win_gpc6.

TABLE 1

Examples 1 to 8, preparation and properties

| Example | 13C-NMR Monomer units | 13C-NMR Content [% by wt.] | Reaction parameters Reaction temperature [° C.] | Reaction parameters Amount of $H_2$ [liters (S.T.P.)] | Reaction parameters Needle penetration [0.1 mm] | DSC $T_g$ [° C.] | DSC Enthalpy of fusion [J/g] | DSC Final melting point [° C.] |
|---|---|---|---|---|---|---|---|---|
| 1 | Ethene | 10 | 85 | 1 | 22 | −34 | 2.3 | 112 |
|   | Propene | 61 | | | | | | |
|   | 1-Butene | 29 | | | | | | |
| 2 | Ethene | 14 | 86 | 0.75 | 21 | −35 | 2.1 | 114 |
|   | Propene | 57 | | | | | | |
|   | 1-Butene | 29 | | | | | | |
| 3 | Ethene | 13 | 86 | 0.5 | 16 | −31 | 7.1 | 115 |
|   | Propene | 70 | | | | | | |
|   | 1-Butene | 17 | | | | | | |
| 4 | 1-Butene | 100 | 96 | 0.25 | 12 | −29 | 12 | 110 |
| 5 | Ethene | 7.2 | 96 | 0.25 | 15 | −34 | 5.5 | 99 |
|   | 1-Butene | 92.8 | | | | | | |
| 6 | Propene | 59 | 90 | 0.125 | 16 | −20 | 9.0 | 116 |
|   | 1-Butene | 41 | | | | | | |
| 7 | 1-Butene | 100 | 96 | 0.125 | 15 | −30 | 9.7 | 110 |
| 8 | Ethene | 9 | 105 | 0 | 38 | −38 | 3.2 | 125 |
|   | Propene | 46 | | | | | | |
|   | 1-Octene | 45 | | | | | | |

| Example | GPC $M_w$ (g/mol) | GPC Poly-dispersity | Alpha | 0 at 190° C. [mPa · s] | Solubility in xylene |
|---|---|---|---|---|---|
| 1 | 133 000 | 5.3 | 0.71 | 221 000 | 99.3 |
| 2 | 170 000 | 6.1 | 0.69 | 355 000 | 99.1 |
| 3 | 203 000 | 7.4 | 0.77 | 529 000 | 99.5 |
| 4 | 95 200 | 7.3 | 0.69 | 910 000 | 98.9 |
| 5 | 96 200 | 6.4 | 0.74 | 730 000 | 99.3 |
| 6 | 195 000 | 8.6 | 0.68 | 2 400 000 | 94.5 |
| 7 | 178 000 | 5.9 | 0.71 | 2 500 000 | 98.8 |
| 8 | 337 000 | 22 | 0.63 | 920 000 | 90.2 |

EXAMPLE 9

Mixtures of Sabic PP 520P, an isotactic polypropylene and the product from example 1 were prepared in various ratios on an ENTEX extruder at 190° C. and during a mixing time of 10 minutes. Details and results are shown in table 2.

EXAMPLE 10

As for example 9; instead of the product from example 1, the product from example 2 was used. Details and results are shown in table 3.

In examples 9 and 10, it is evident that, in the range where smaller amounts of the polyolefin according to the invention are admixed (up to about 30% by weight) the elongation at break is considerably improved and the glass transition temperature $T_g$ is decreased to a greater extent than corresponds to the composition ratio. The elongation at break is relevant, for example, for sheets, while the position of $T_g$ greatly influences the low-temperature impact strength. The melt flow is surprisingly reduced in this range, and it is for this reason that such molding materials are suitable for extrusion.

TABLE 2

Example 9; mixtures and results

| PO according to the invention [% by wt.] from example 1 | Blend partner [% by wt.] Sabic PP 520 P | Modulus of elasticity [MPa] DIN ISO 527/V | Tensile strength [MPa] DIN ISO 527/V | Elongation at break [%] DIN ISO 527/V | $T_g$ [° C.] DIN 53765 | $MFR_{190° C.}$ [g/10 min.] DIN ISO 1133 |
|---|---|---|---|---|---|---|
| 0 | 100 | 1700 | 36 | 14 | −2 | 13 |
| 10 | 90 | 1235 | 23 | 434 | −15 | 9 |
| 30 | 70 | 671 | 13.5 | 706 | −30 | 9 |
| 50 | 50 | 239 | 7 | 740 | −31 | 17 |
| 70 | 30 | 74 | 3 | 734 | −32 | 30 |
| 100 | 0 | n.d.[1] | 2 | 755 | −35 | 73 |

[1] n.d. = not determined

TABLE 3

Example 10; mixtures and results

| PO according to the invention [% by wt.] from example 2 | Blend partner [[% by wt.] Sabic PP 520 P | Modulus of elasticity [MPa] DIN ISO 527/V | Tensile strength [MPa] DIN ISO 527/V | Elongation at break [%] DIN ISO 527/V | $T_g$ [° C.] DIN 53765 | $MFR_{190° C.}$ [g/10 min.] DIN ISO 1133 |
|---|---|---|---|---|---|---|
| 0 | 100 | 1700 | 36 | 14 | −2 | 13 |
| 10 | 90 | 1210 | 26 | 413 | −20 | 11 |
| 30 | 70 | 616 | 17.5 | 780 | −31 | 9 |
| 50 | 50 | 236 | 11.4 | 820 | −31 | 12 |
| 70 | 30 | 67 | 8 | 810 | −33 | 23 |
| 100 | 0 | n.d.[1] | 2 | 814 | −35 | 62 |

[1] n.d. = not determined

EXAMPLE 11

A blend was prepared according to example 10 and the notched impact strength was measured at 23° C. Details and results in comparison with pure isotactic polypropylene are shown in table 4.

EXAMPLE 12

A blend was prepared according to example 11; here, however, the product from example 3 was used instead of the product from example 2. The notched impact strength was then measured at 23° C. Details and results in comparison with pure isotactic polypropylene are shown in table 5.

TABLE 4

Example 11; mixture and results

| PO according to the invention [% by wt.] | Blend partner [[% by wt.] Sabic PP 520 P | Notched impact strength 23° C. [kJ/m²] DIN EN ISO 179 |
|---|---|---|
| from example 2 | | |
| 0 | 100 | 2.2 |
| 50 | 50 | 32 |

TABLE 5

Example 12; mixture and results

| PO according to the invention [% by wt.] | Blend partner [[% by wt.] Sabic PP 520 P | Notched impact strength 23° C. [kJ/m²] DIN EN ISO 179 |
|---|---|---|
| from example 3 | | |
| 0 | 100 | 2.2 |
| 50 | 50 | 40 |

The invention claimed is:

1. A polyolefin comprising the following monomer units:
   a) not more than 25% by weight of units which are derived from ethene,
   b) not more than 75% by weight of units which are derived from propene and
   c) from 5 to 100% by weight of units which are derived from an α-olefin having 4 to 20 carbon atoms,
   the polyolefin having the following parameters:
   d) a weight-average molecular weight in the range of from 70 000 to 10 000 000 g/mol,
   e) a polydispersity in the range of from 4 to 60,
   f) a melt viscosity, measured by oscillation rheometry at a shear rate of 1 Hz at 190° C., in the range of from 100 000 to 100 000 000 mPa·s,
   g) a needle penetration in the range of from 3 to 70·0.1 mm,
   h) an enthalpy of fusion in the range of from 2 to 100 J/g,
   i) a glass transition temperature $T_g$ in the range of from −15° C. to −80° C., and
   j) a final melting point of the crystalline fraction in the range of from 85 to 175° C.

2. The polyolefin according to claim 1, wherein the weight-average molecular weight is from 100 000 g/mol to 10 000 000 g/mol.

3. The polyolefin according to claim 1, produced by a process comprising polymerizing α-olefin monomers in the presence of a $TiCl_3 \cdot (AlCl_3)_n$ mixed catalyst, n being from 0.2 to 0.5, and a trialkylaluminum compound cocatalyst with a molar ratio of mixed catalyst to cocatalyst of from 1:1 to 1:10.

4. The polyolefin according to claim 1, wherein said polyolefin has an alpha value in the range of from 0.5 to 0.9.

5. A polyolefin composition comprising the following components:
   I. from 0.1 to 99.9% by weight of the polyolefin according to claim 1, and II. from 99.9 to 0.1% by weight of at least one polyolefin selected from the group consisting of ethylene polymer, isotactic polypropylene polymer, syndiotactic polypropylene polymer, isotactic poly-1-butene and syndiotactic poly-1-butene, wherein the weight percents are based on the total combined weight of components I and II.

6. The polyolefin composition according to claim 5, wherein component II is a mixture of an ethylene polymer and a polyolefin selected from the group consisting of isotactic polypropylene polymer, syndiotactic polypropylene polymer, isotactic poly-1-butene and syndiotactic poly-1-butene.

7. A molding material for producing shaped articles comprising the polyolefin composition according to claim 5.

8. A molding material for producing shaped articles comprising the following components:
   I. from 0.1 to 50% by weight of the polyolefin according to claim 1, and
   II. from 99.9 to 50% by weight of an isotactic or syndiotactic propylene polymer,
   wherein the weight percents are based on the total combined weight of components I and II.

9. A process for producing a shaped article comprising molding the molding material of claim 8 into said shaped article.

10. A process for producing a sealing sheet comprising molding the molding material of claim 8 into said sealing sheet.

11. A shaped article produced by the process according to claim 9.

12. A sealing sheet produced by the process according to claim 10.

13. A process for producing a shaped article comprising molding the polyolefin composition of claim 5 into said shaped article.

14. A process for producing a sealing sheet comprising molding the polyolefin composition of claim 5 into said sealing sheet.

15. A shaped article produced by the process according to claim 13.

16. A sealing sheet produced by the process according to claim 14.

17. A process for producing a shaped article comprising molding the polyolefin of claim 1 into said shaped article.

18. A process for producing a sealing sheet comprising molding the polyolefin of claim 1 into said sealing sheet.

19. A shaped article produced by the process according to claim 17.

20. A sealing sheet produced by the process according to claim 18.

21. The polyolefin according to claim 1, wherein units derived from ethene are present.

22. The polyolefin according to claim 3, wherein polymerizing is carried out at a temperature of 70 to 220° C.

* * * * *